United States Patent
Hsieh (10) Patent No.: US 9,499,237 B1
(45) Date of Patent: Nov. 22, 2016

(54) LASHING ROD ASSEMBLY

(71) Applicant: Jung-Kuang Hsieh, Taichung (TW)

(72) Inventor: Jung-Kuang Hsieh, Taichung (TW)

(*) Notice: Subject to any disclaimer, the term of this patent is extended or adjusted under 35 U.S.C. 154(b) by 0 days.

(21) Appl. No.: 15/053,363

(22) Filed: Feb. 25, 2016

(51) Int. Cl.
  *B60P 7/08* (2006.01)
  *B63B 25/28* (2006.01)
  *B60P 7/13* (2006.01)

(52) U.S. Cl.
  CPC . *B63B 25/28* (2013.01); *B60P 7/13* (2013.01)

(58) Field of Classification Search
  CPC .................................. B60P 7/13; B63B 25/28
  USPC ............. 410/68, 77, 80, 81, 85, 96, 97, 100
  See application file for complete search history.

(56) References Cited

U.S. PATENT DOCUMENTS

| | | | |
|---|---|---|---|
| 6,666,633 B2 * | 12/2003 | Hsieh | B60P 7/13 410/100 |
| 7,101,130 B2 | 9/2006 | Hsieh | |
| 7,422,400 B2 | 9/2008 | Hsieh | |
| 7,575,403 B2 | 8/2009 | Hsieh | |

* cited by examiner

*Primary Examiner* — Stephen Gordon
(74) *Attorney, Agent, or Firm* — Osha Liang LLP (57) ABSTRACT

A lashing rod assembly includes a lashing rod and a hook member. The lashing rod is displaceable between upper and lower positions. The hook member includes a weight segment, a power segment, a hook, and a flange. The weight segment is configured to extend into an inner space of a corner casting of a shipping container. The power segment extends into a through hole of the lashing rod. The hook is configured to be in abutting engagement with an inner surface of the corner casting when the lashing rod is displaced to the lower position. The flange has an interior fulcrum area configured to bear on a shoulder region of the through hole so as to permit the weight segment to be angularly movable during downward displacement of the lashing rod.

4 Claims, 13 Drawing Sheets

LASHING ROD ASSEMBLY

CROSS-REFERENCE TO RELATED APPLICATION

This application claims priority from Taiwanese application no. 104129639, filed on Sep. 8, 2015.

FIELD

The disclosure relates to a lashing rod assembly, more particularly to a lashing rod assembly for fastening a shipping container to a platform.

BACKGROUND

Generally, when containers are being transported in a cargo vessel or ship, the containers are stacked on the deck of the ship and secured by fasteners in order to prevent undesired movement or toppling down of the stacked containers. The inventor of this application has proposed several such fasteners, such as those disclosed in U.S. Pat. No. 7,101,130B2, U.S. Pat. No. 7,422,400B2, and U.S. Pat. No. 7,575,403B2.

Figure 1:
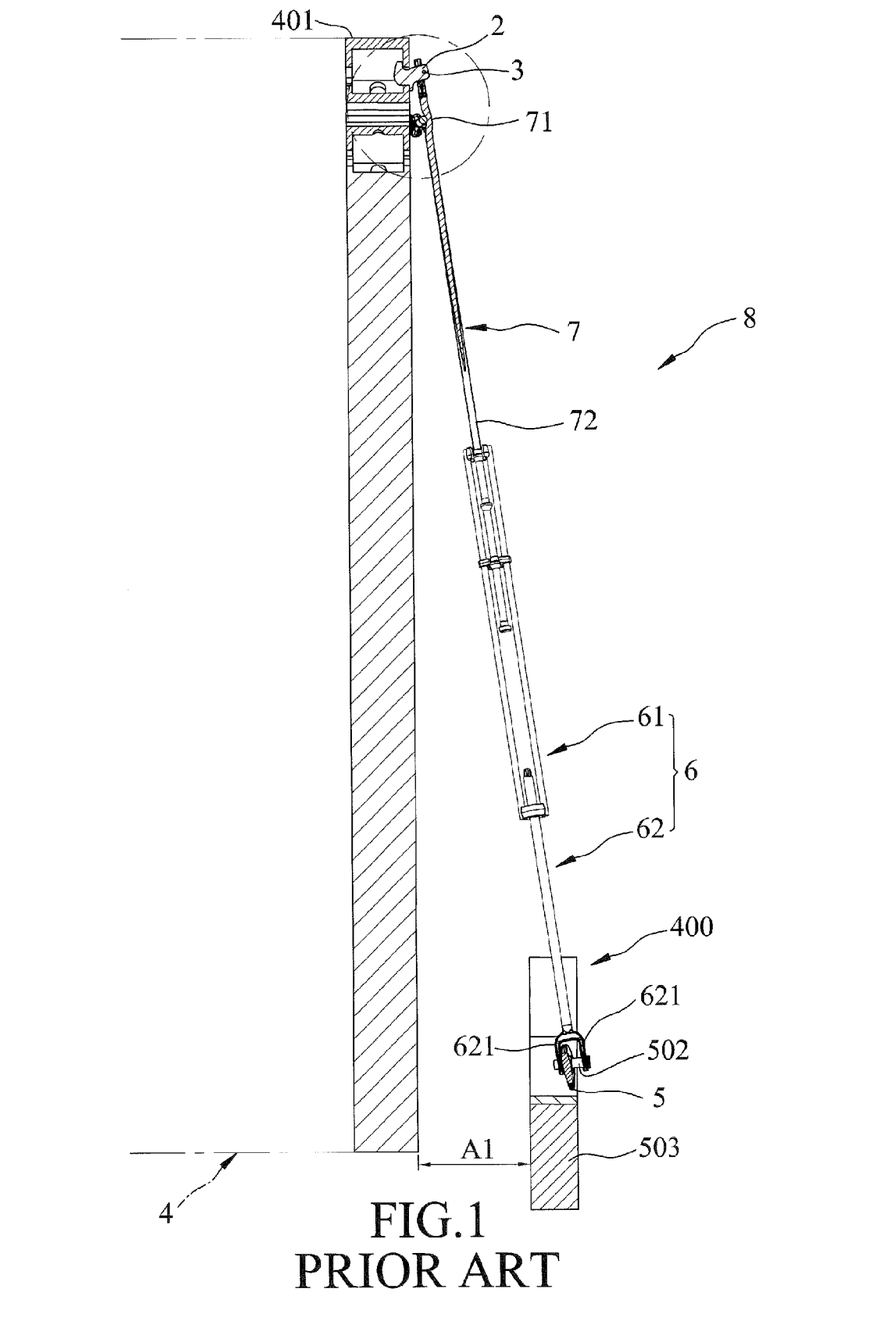
FIG. 1 is a partly sectional view of a conventional fastener for fastening a shipping container.
Figure 2:
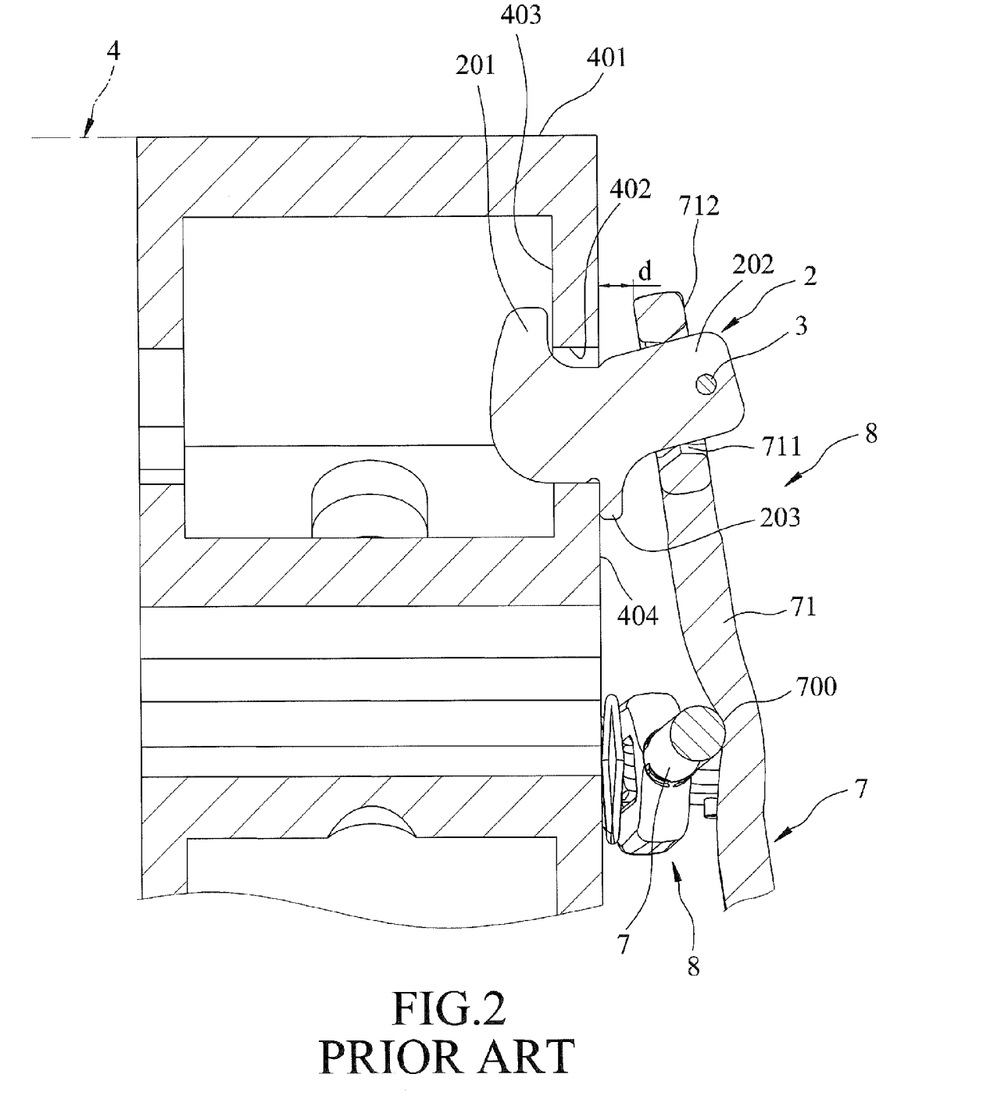
FIG. 2 is a fragmentary partially enlarged view of FIG. 1.

As shown in FIGS. 1 and 2, a conventional fastener 8 is used for fastening a shipping container 4 to a deck 400 of a ship (not shown), and includes a turnbuckle 6, a lashing rod 7, and a hook member 2. The turnbuckle 6 includes upper and lower segments 61, 62 which are movable relative to each other and which can be secured to each other so as to tighten the lashing rod 7. The lower segment 62 has two lugs 621 which are secured to an eye plate 5 by virtue of a pin 502. The eye plate 5 is secured to a mounting frame 503 mounted on the deck 400 of the ship. The lashing rod 7 has upper and lower segments 71, 72. The lower segment 72 is connected to the upper segment 61 of the turnbuckle 6. The upper segment 71 has a through hole 711 (see FIG. 2). The hook member 2 has a main body 202, a hook 201, and a stop 203. The main body 202 extends through the through hole 711 and is pivotally mounted to the upper segment 71 by virtue of a pin 3. The pin 3 is mounted to an outward surface 712 of the upper segment 71. The hook 201 can extend into a side access opening 402 of a corner casting 401 of the shipping container 4. When the lashing rod 7 is tightened, the hook 201 and the stop 203 are in abutting engagement with inner and outer surfaces 403, 404 of the corner casting 401, respectively.

The mounting frame 503 is normally spaced apart from a bottommost one of the shipping containers 4 by a limited distance (A1), as shown in FIG. 1, and a minimum distance (d) between the lashing rod 7 and the shipping container 4 is relatively small (see FIG. 2). Therefore, when a plurality of the fasteners 8 are used to fasten the shipping containers 4 to the deck 400 with a criss-cross lashing arrangement, the lashing rods 7 of two adjacent ones of the fasteners 8 may rub against each other, and may thus deform and suffer dents 700 (only one is shown in FIG. 2).

Figure 3:
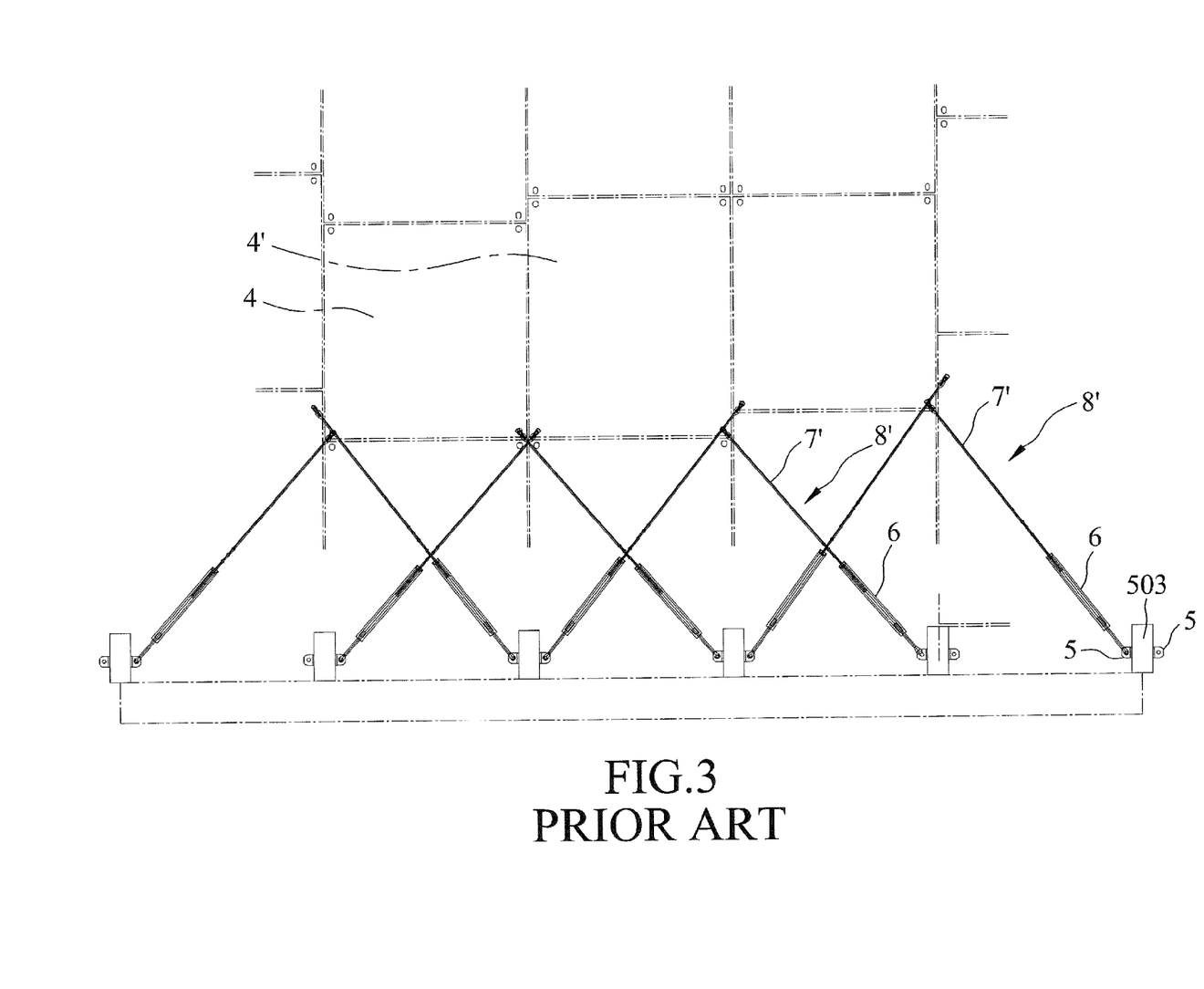
FIG. 3 is a schematic view showing another type of conventional fastener for fastening a shipping container.
Figure 4:
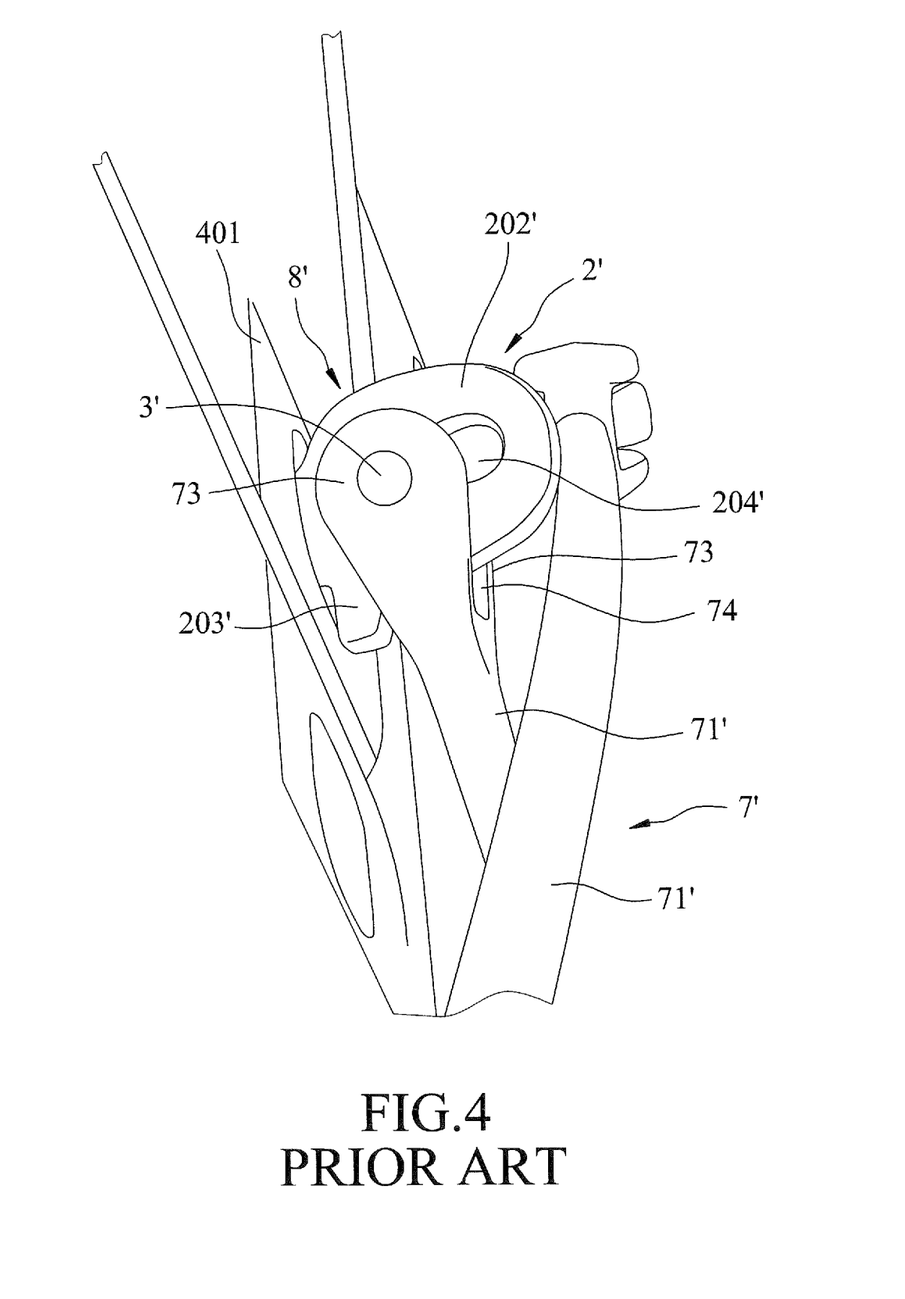
FIG. 4 is a fragmentary partially enlarged view of the conventional fastener of FIG. 3.

To solve the above problem, another fastener 8' is proposed (see FIGS. 3 and 4). The fastener 8' includes a turnbuckle 6, a lashing rod 7', and a hook member 2'. An upper segment 71' of the lashing rod 7' has two lugs 73 which are spaced apart from each other by a slot 74. The hook member 2' includes a main body 202', a hook (not shown), and a stop 203'. The main body 202' extends through the slot 74 and is pivotally mounted to the lugs 73 by a pin 3' that extends through the lugs 73 and an elongated slot 204' of the main body 202'. However, when the fasteners 8' are used to fasten the shipping containers 4, 4' to a mounting frame 503, a distance between the mounting frame 503 and the bottommost one of the shipping containers 4, 4' is larger than the distance (A1) shown in FIG. 1, which results in a waste of deck space.

SUMMARY

Therefore, an object of the disclosure is to provide a novel lashing rod assembly for fastening a shipping container to a platform, such as a deck. With the provision of the lashing rod assembly, the distance between a mounting frame and a bottommost one of shipping containers can be kept short, and possible deformation of a lashing rod can be prevented.

According to the disclosure, a lashing rod assembly is used for fastening a shipping container to a platform. The shipping container has a corner casting which defines therein an inner space. The corner casting has a side wall which has an outer surface and an inner surface that is opposite to the outer surface and that borders the inner space, and which has a side access opening extending through the inner surface to be in spatial communication with the inner space. The lashing rod assembly includes a lashing rod and a hook member. The lashing rod extends along a lengthwise axis to terminate at upper and lower end segments, and is displaceable between a lower position, where the lashing rod is in a tightened state, and an upper position, where the lashing rod is in an untightened state. The lower end segment is adapted to couple with the platform. The upper end segment has an inward surface configured to confront the shipping container, an outward surface opposite to the inward surface, and an inner peripheral surface which extends in a transverse direction to connect the inward and outward surfaces, and which defines a through hole. The inner peripheral surface has an outer surface region, and an inner surface region which has a dimension smaller than that of the outer surface region so as to define a shoulder region between the outer and inner surface regions. The hook member includes a weight segment, a power segment, a hook, and a flange. The weight segment extends in the transverse direction to terminate at an inner end region which is configured to extend through the side access opening and into the inner space of the corner casting. The power segment is configured to be inserted in the transverse direction into the through hole and terminating at an outer end region. The power segment is pressed downward by the inner surface region during downward displacement of the lashing rod from the upper position to the lower position. The hook extends radially from the inner end region of the weight segment, and is configured to be in abutting engagement with the inner surface of the side wall when the lashing rod is displaced to the lower position. The flange extends radially from the outer end region of the power segment to form an interior fulcrum area which is configured to bear on the shoulder region so as to permit the weight segment to be angularly movable about a movable fulcrum point on the interior fulcrum area during the downward displacement of the lashing rod to thereby bring the hook into abutting engagement with the inner surface of the side wall.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Before the disclosure is described in greater detail, it should be noted that like elements are denoted by the same reference numerals throughout the disclosure.

Figure 5:
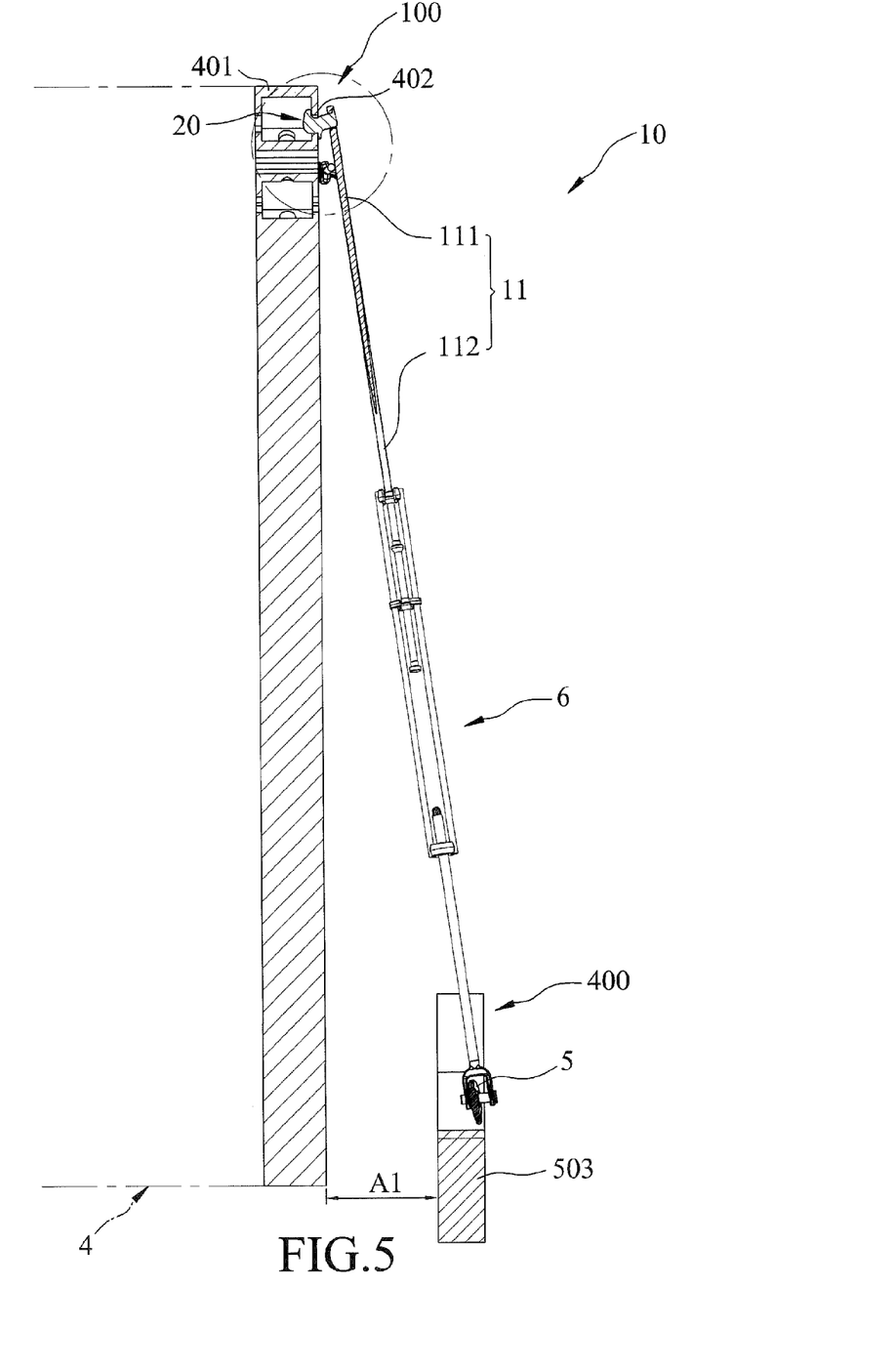
FIG. 5 is a partly sectional view illustrating a lashing rod assembly of a fastener according to a first embodiment of the disclosure.
Figure 6:
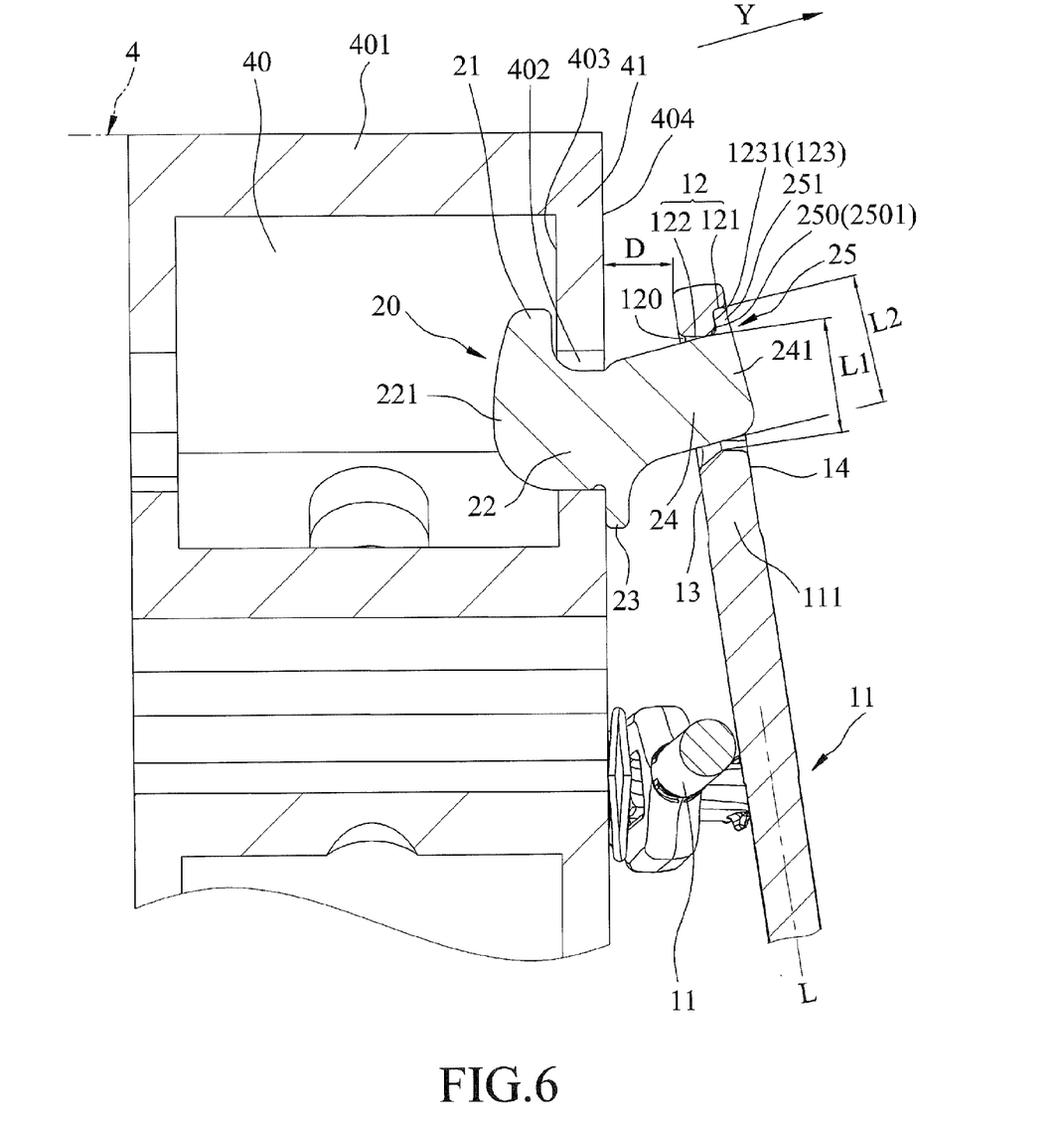
FIG. 6 is a fragmentary partially enlarged view of FIG. 5.

With reference to FIGS. 5 and 6, a fastener 10 according to a first embodiment of the disclosure is used for fastening a shipping container 4 to a platform 400, such as a deck of a ship, and includes a lashing rod assembly 100 and a turnbuckle 6. The lashing rod assembly 100 includes a lashing rod 11 and a hook member 20. The turnbuckle 6 is used to tighten the lashing rod 11 of the lashing rod assembly 100 and is coupled to an eye plate 5 of a mounting frame 503 mounted on the deck 400. The shipping container 4 has a corner casting 401 which defines therein an inner space 40. The corner casting 401 has a side wall 41 which has an outer surface 404 and an inner surface 403 that is opposite to the outer surface 404 and that borders the inner space 40, and which has a side access opening 402 extending through the inner surface 403 to be in spatial communication with the inner space 40.

The lashing rod 11 is made of metal and is integrally formed. The lashing rod 11 extends along a lengthwise axis (L) to terminate at upper and lower end segments 111, 112, and is displaceable between a lower position, where the lashing rod 11 is in a tightened state (FIGS. 5 and 6), and an upper position, where the lashing rod 11 is in an untightened state (not shown). The lower end segment 112 is adapted to couple with the platform 400 by virtue of the turnbuckle 6. The upper end segment 111 has an inward surface 13 configured to confront the shipping container 4, an outward surface 14 opposite to the inward surface 13, and an inner peripheral surface 12 which extends in a transverse direction (Y) to connect the inward and outward surfaces 13, 14, and which defines a through hole 120. The inner peripheral surface 12 has outer and inner surface regions 121, 122. The inner surface region 122 has a dimension smaller than that of the outer surface region 121 so as to define a shoulder region 123 between the outer and inner surface regions 121, 122. In this embodiment, the through hole 120 is not circular in cross-section, and is substantially rectangular in cross-section (see FIG. 7). The through hole 120 has a minimum length (L1) in a direction of the lengthwise axis (L). The shoulder region 123 has left and right shoulder areas 1232, 1233, and an upper shoulder area 1231 on which the interior fulcrum area 250 of the flange 25 bears (see FIGS. 6 and 7).

Figure 7:
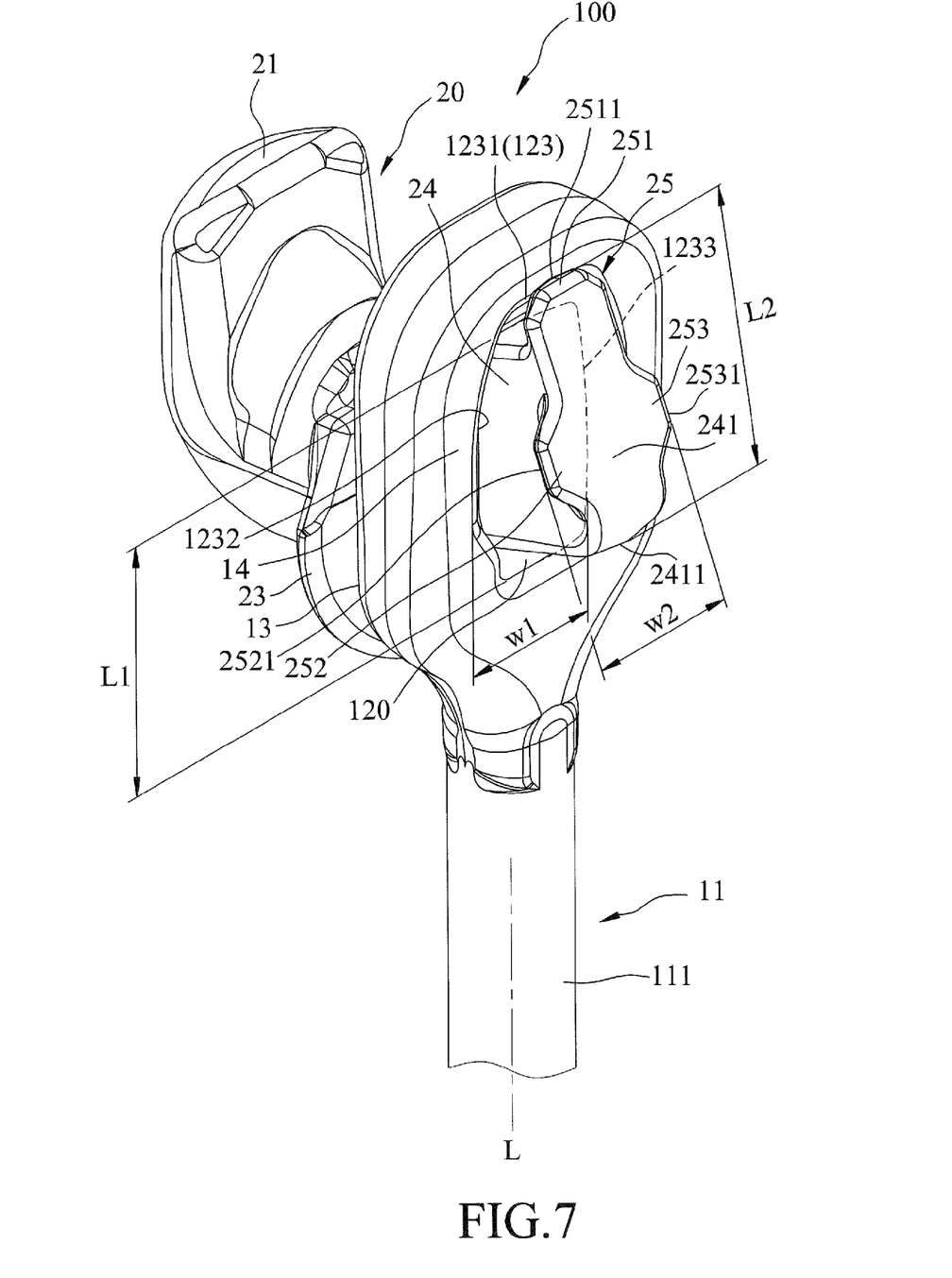
FIG. 7 is a fragmentary perspective view of the lashing rod assembly according to the first embodiment.

As shown in FIGS. 6 and 7, the hook member 20 is made of metal and is integrally formed. The hook member 20 includes a weight segment 22, a power segment 24, a hook 21, and a flange 25.

The weight segment 22 is rectangular in cross-section and extends in the transverse direction (Y) to terminate at an inner end region 221 which is configured to extend through the side access opening 402 and into the inner space 40 of the corner casting 401.

The power segment 24 is rectangular in cross-section and is configured to be inserted in the transverse direction (Y) into the through hole 120 and terminating at an outer end region 241. The power segment 24 can be pressed downward by the inner surface region 122 during downward displacement of the lashing rod 11 from the upper position to the lower position.

The hook 21 extends radially from the inner end region 221 of the weight segment 22, and is configured to be in abutting engagement with the inner surface 403 of the side wall 41 when the lashing rod 11 is displaced to the lower position.

The flange 25 extends radially from the outer end region 241 of the power segment 24 to form an interior fulcrum area 250 which is configured to bear on the shoulder region 123 so as to permit the weight segment 22 to be angularly movable about a movable fulcrum point 2501 on the interior fulcrum area 250 during the downward displacement of the lashing rod 11 to thereby bring the hook 21 into abutting engagement with the inner surface 403 of the side wall 41.

In this embodiment, the hook member 20 further includes a stop 23 which extends radially from the weight segment 22 oppositely to the hook 21, and which is configured such that during the downward displacement of the lashing rod 11, the stop 23 is brought into abutting engagement with the outer surface 404 of the side wall 41.

As shown in FIG. 7, the flange 25 has an upper flange region 251, and left and right flange regions 252, 253. The upper flange region 251 extends upward from the outer end region 241 of the power segment 24 to terminate at an upper flange edge 2511, and has the interior fulcrum area 250 (see FIG. 6). The left flange region 252 extends leftward from the outer end region 241 to terminate at the left flange edge 2521. The right flange region 253 extends rightward from the outer end region 241 to terminate at a right flange edge 2531. The outer end region 241 has a bottom edge 2411 opposite to the upper flange edge 2511. The bottom edge 2411 and the upper flange edge 2511 define therebetween a length (L2) which is not less than the minimum length (L1) of the through hole 120. The left and right flange edges 2521, 2531 define therebetween a flange width (w2) (see FIGS. 7 and 8).

Figure 8:
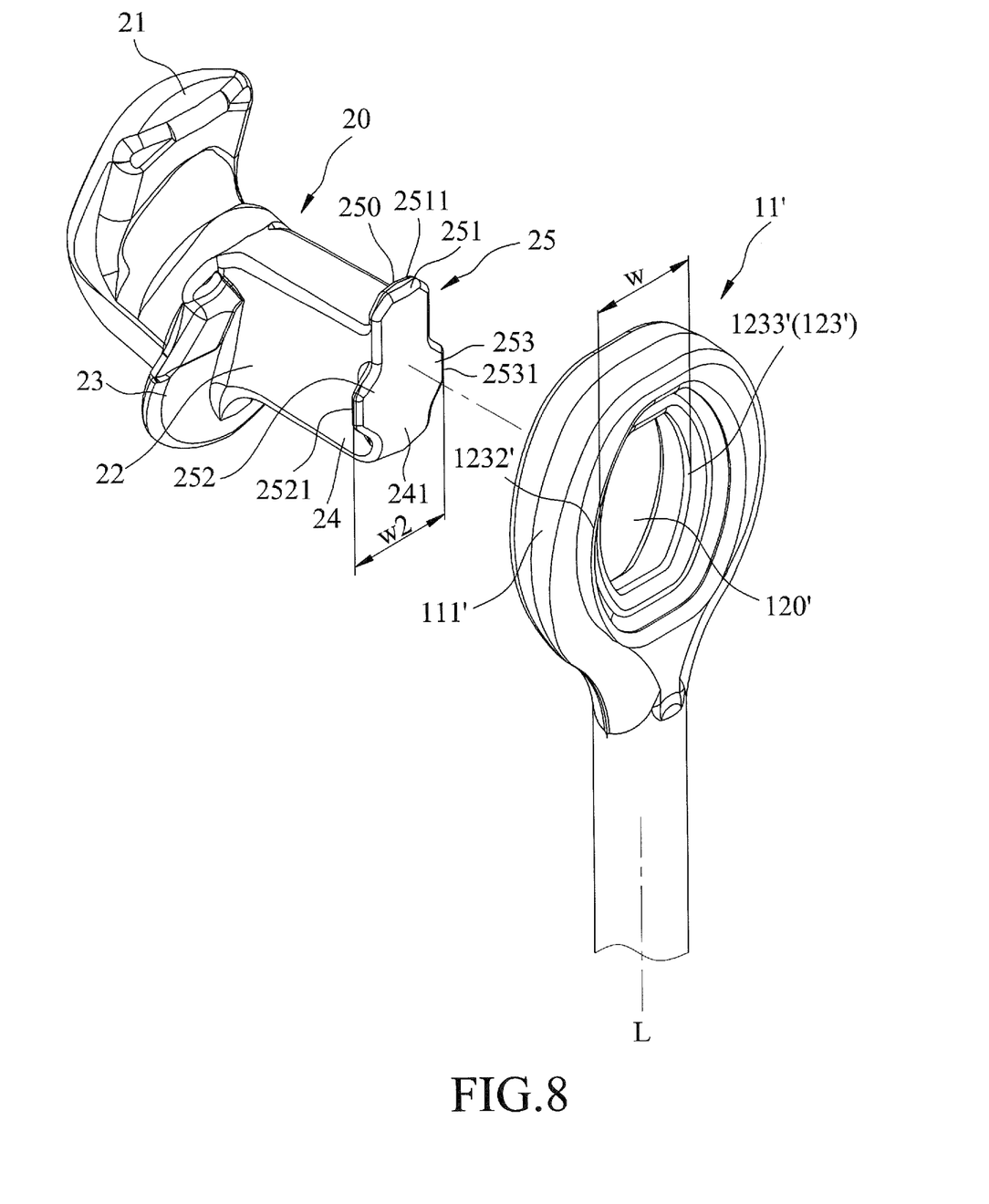
FIG. 8 is a fragmentary perspective view illustrating a lashing rod and a hook member according to the first embodiment prior to assembly.

To facilitate explanation of the assembly of the hook member 20 to the lashing rod 11, the lashing rod 11 and the components thereof prior to assembly are denoted by primed numbers, e.g., the lashing rod 11, the through hole 120, and the shoulder region 123 before assembly are respectively referred to as lashing rod 11', through hole 120' and shoulder region 123'. With reference to FIG. 8, before insertion of the power segment 24 of the hook member 20 into the through hole 120', the through hole 120' has a substantially oval cross-section and has an initial width (w) which is defined by the left and right shoulder areas 1232', 1233' and which is greater than the flange width (w2) so as to permit the left and right flange edges 2521, 2531 as well as the power segment 24 to pass therethrough.

Figure 9:
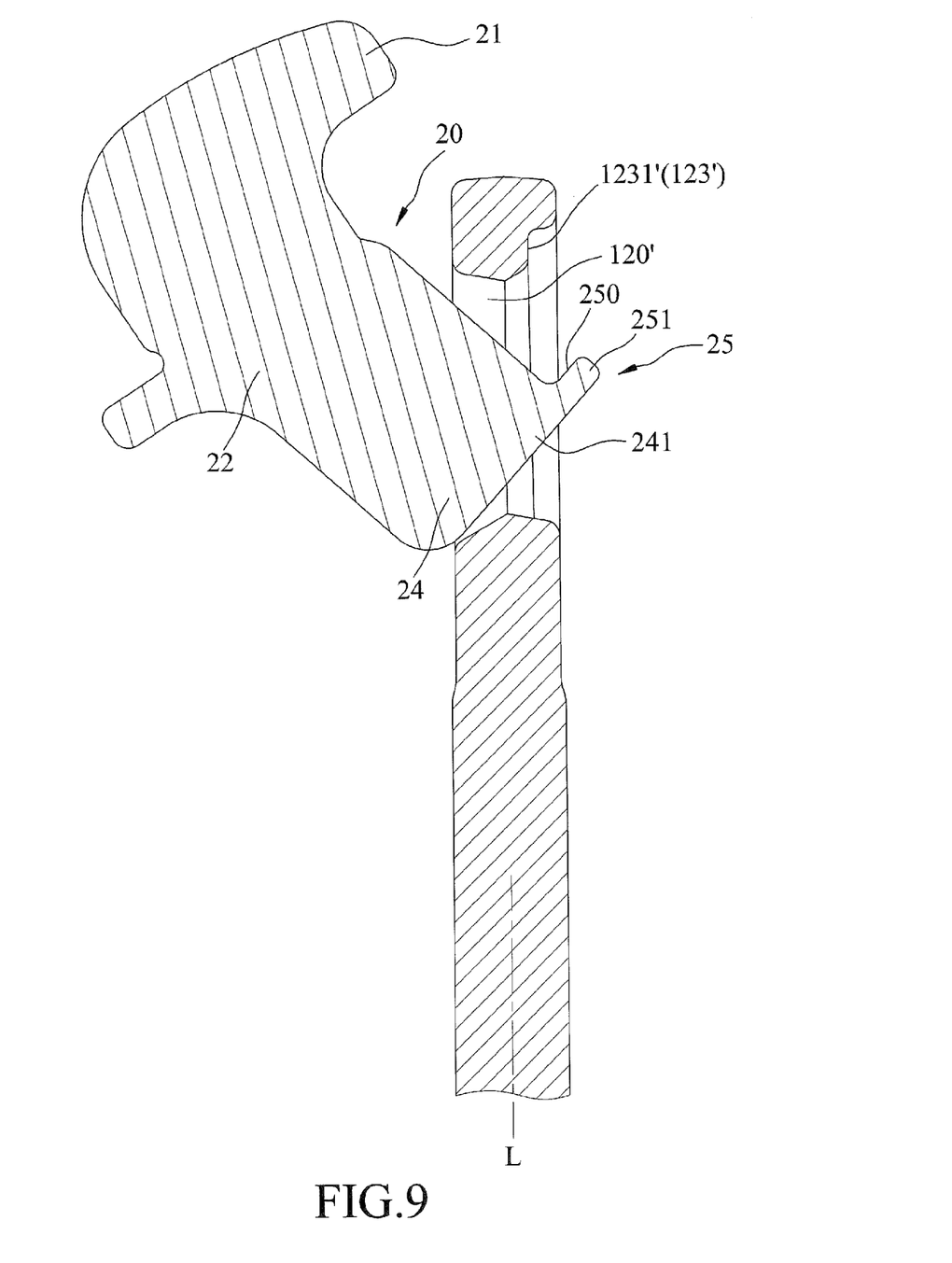
FIG. 9 is a fragmentary cross-sectional view illustrating how the hook member is inserted into a through hole of the lashing rod during assembly.
Figure 10:
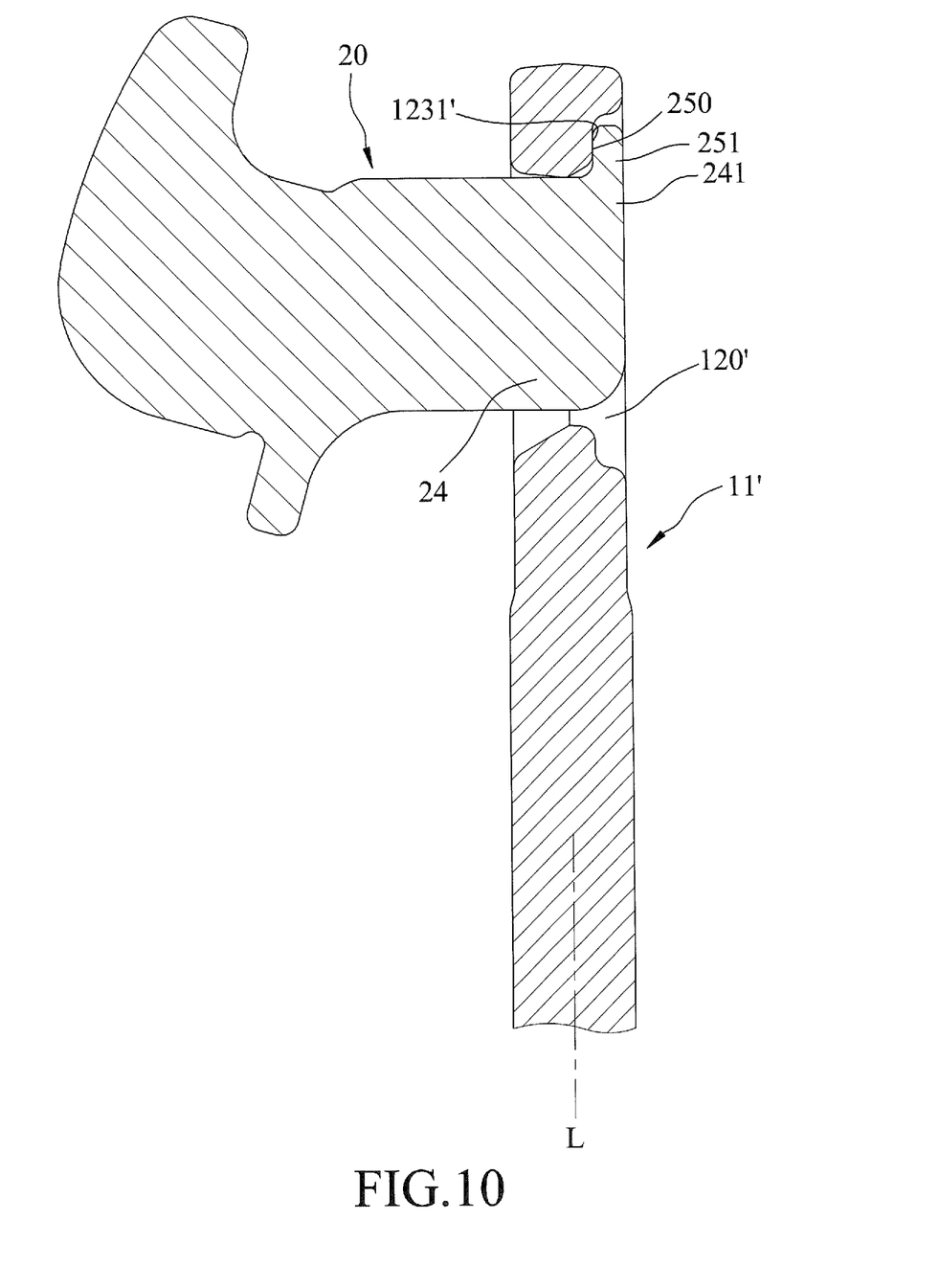
FIG. 10 is a fragmentary cross-sectional view illustrating that a flange of the hook member bears on a shoulder region of the lashing rod.
Figure 11:
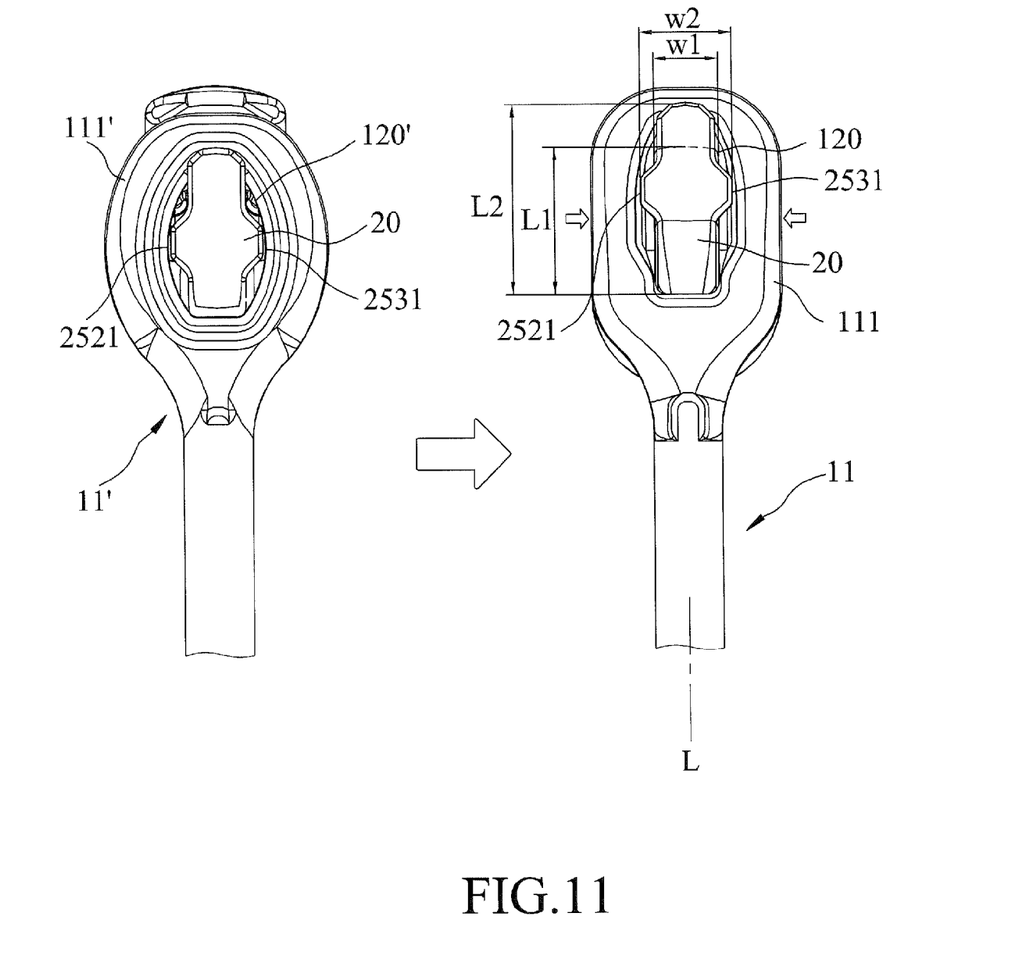
FIG. 11 schematically illustrates how the lashing rod is machine-pressed during assembly.

With reference to FIG. 9, the power segment 24 is inserted inclinedly into the through hole 120'. After the interior fulcrum area 250 is disposed to rest on the upper shoulder area 1231' (i.e., after the power segment 24 has been inserted into the through hole 120') (see FIGS. 10 and 11), the upper end segment 111' of the lashing rod 11' is subjected to machine-pressing such that the though hole 120' with a substantially oval cross-section is deformed into the through hole 120 with a substantially rectangular cross-section and the initial width (w) of the through hole 120' is reduced to a final width (w1) shown in FIG. 7. The final width (w1) is defined between the left and right shoulder areas 1232, 1233, and is smaller than the flange width (w2), thereby preventing removal of the power segment 24 of the hook member 20 from the through hole 120 of the lashing rod 11.

As shown in FIG. 5, the lashing rod assembly 10 can be used in a conventional cargo vessel or ship (not shown) since a distance (A1) between the mounting frame 503 and the bottommost one of the shipping containers 4 can be kept short and is the same as the distance (A1) shown in FIG. 1. In addition, the hook member 20 is movably pivoted in the through hole 120 of the lashing rod 11, and thus, a distance between the lashing rod 11 and the respective shipping container 4 can be increased. After the lashing rod 11 is displaced to the lower position, the lashing rod 11 is still movable relatively to the respective shipping container 4 by a distance (D). As such, the lashing rods 11 are less likely to deform during the course of a long voyage.

Furthermore, the lashing rod 11 and the hook member 20 of the lashing rod assembly 100 have simple structures with good structural strength, and can be assembled easily.

Figure 12:
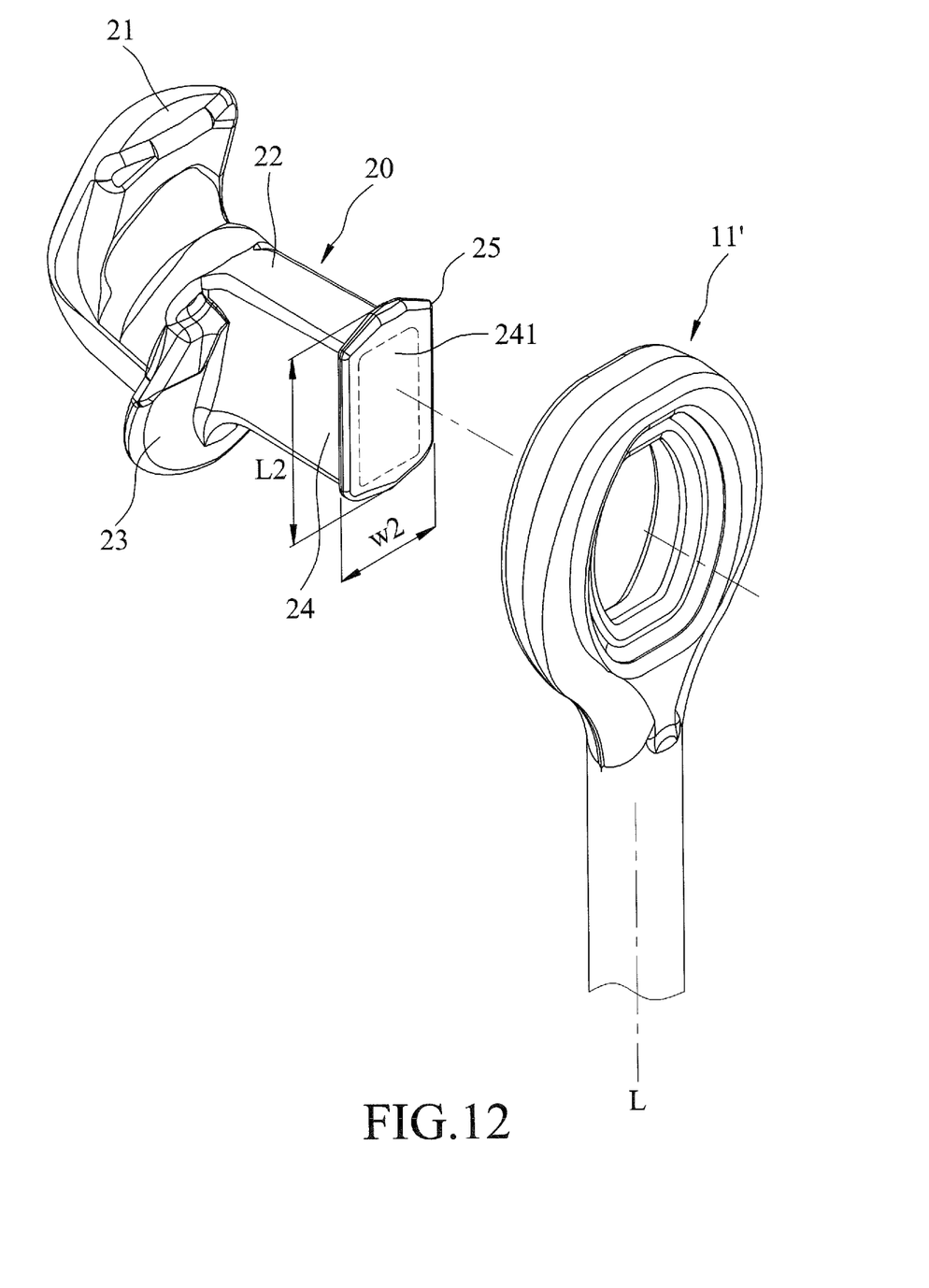
FIG. 12 is a fragmentary perspective view illustrating a lashing rod and a hook member according to a second embodiment of the disclosure prior to assembly.

FIG. 12 is a fragmentary perspective view of a lashing rod 11' and a hook member 20 according to a second embodiment of the disclosure prior to assembly. The second embodiment is similar to the first embodiment, except that the flange 25 of the hook member 20 extends in a circumferential direction to surround the outer end region 241 of the power segment 24, and has a substantially rectangular contour.

Figure 13:
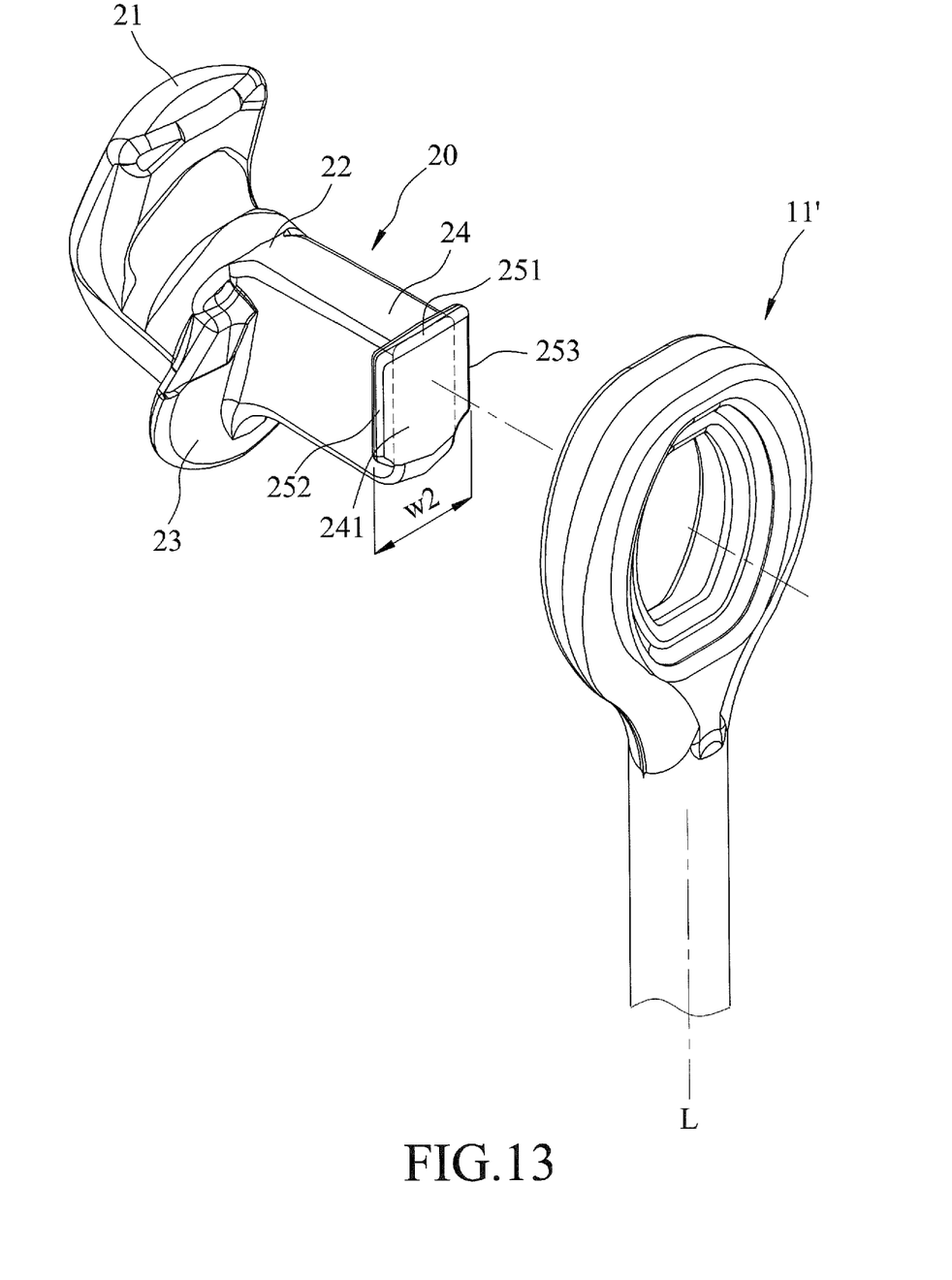
FIG. 13 is a fragmentary perspective view of a lashing rod and a hook member according to a third embodiment of the disclosure prior to assembly.

FIG. 13 is a fragmentary perspective view of a lashing rod 11' and a hook member 20 according to a third embodiment of the disclosure prior to assembly. The third embodiment is similar to the first embodiment, except that the left and right flange regions 252, 253 of the hook member 20 further extend upwardly to connect with the upper flange region 251.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lashing rod assembly for fastening a shipping container to a platform, the shipping container having a corner casting which defines therein an inner space, the corner casting having a side wall which has an outer surface and an inner surface that is opposite to the outer surface and that borders the inner space, and which has a side access opening extending through the inner surface to be in spatial communication with the inner space, said lashing rod assembly comprising:
    a lashing rod extending along a lengthwise axis to terminate at upper and lower end segments, and displaceable between a lower position, where said lashing rod is in a tightened state, and an upper position, where said lashing rod is in an untightened state, said lower end segment being adapted to couple with the platform, said upper end segment having an inward surface configured to confront the shipping container, an outward surface opposite to said inward surface, and an inner peripheral surface which extends in a transverse direction to connect said inward and outward surfaces, and which defines a through hole, said inner peripheral surface having an outer surface region, and an inner surface region which has a dimension smaller than that of said outer surface region so as to define a shoulder region between said outer and inner surface regions; and
    a hook member including
        a weight segment extending in the transverse direction to terminate at an inner end region which is configured to extend through the side access opening and into the inner space of the corner casting,
        a power segment configured to be inserted in the transverse direction into said through hole and terminating at an outer end region, said power segment being pressed downward by said inner surface region during downward displacement of said lashing rod from the upper position to the lower position,
        a hook extending radially from said inner end region of said weight segment, and configured to be in abutting engagement with the inner surface of the side wall when said lashing rod is displaced to the lower position, and
        a flange extending radially from said outer end region of said power segment to form an interior fulcrum area which is configured to bear on said shoulder region so as to permit said weight segment to be angularly movable about a movable fulcrum point on said interior fulcrum area during the downward displacement of said lashing rod to thereby bring said hook into abutting engagement with the inner surface of the side wall.

2. The lashing rod assembly according to claim 1, wherein said hook member further includes a stop which extends radially from said weight segment oppositely to said hook, and which is configured such that during the downward displacement of said lashing rod, said stop is brought into abutting engagement with the outer surface of the side wall.

3. The lashing rod assembly according to claim 1, wherein said shoulder region has left and right shoulder areas, and an upper shoulder area on which said interior fulcrum area of said flange bears.

4. The lashing rod assembly according to claim 3, wherein said flange has left and right flange edges which define therebetween a flange width, said through hole having an initial width greater than said flange width prior to insertion of said power segment into said through hole so as to permit said left and right flange edges as well as said power segment to pass therethrough, said upper end segment of said lashing rod being machine-pressed after insertion of said power segment into said through hole such that the initial width of said through hole is reduced to a final width smaller than the flange width to thereby prevent removal of said power segment from said through hole.

* * * * *